United States Patent
Oh

(10) Patent No.: US 7,636,863 B2
(45) Date of Patent: Dec. 22, 2009

(54) APPARATUS FOR CONTROLLING POWER OF PROCESSOR HAVING A PLURALITY OF CORES AND CONTROL METHOD OF THE SAME

(75) Inventor: Jang Geun Oh, Suwon-si (KR)

(73) Assignee: LG Electronics Inc., Seoul (KR)

( * ) Notice: Subject to any disclaimer, the term of this patent is extended or adjusted under 35 U.S.C. 154(b) by 385 days.

(21) Appl. No.: 11/015,803

(22) Filed: Dec. 20, 2004

(65) Prior Publication Data

US 2005/0154931 A1    Jul. 14, 2005

(30) Foreign Application Priority Data

Jan. 13, 2004   (KR) ................ 10-2004-0002127
Jan. 13, 2004   (KR) ................ 10-2004-0002128

(51) Int. Cl.
  *G06F 1/00*   (2006.01)
  *G06F 1/26*   (2006.01)
  *G06F 1/32*   (2006.01)

(52) U.S. Cl. ............ 713/320; 713/300; 713/322; 713/323; 713/324

(58) Field of Classification Search ......... 713/300, 713/320, 322, 323, 324; 714/10
See application file for complete search history.

(56) References Cited

U.S. PATENT DOCUMENTS

| | | | |
|---|---|---|---|
| 5,784,628 A * | 7/1998 | Reneris ............ | 713/300 |
| 5,915,082 A * | 6/1999 | Marshall et al. ........ | 714/11 |
| 5,918,061 A * | 6/1999 | Nikjou ............... | 713/324 |
| 6,396,169 B1 * | 5/2002 | Voegeli et al. ......... | 307/52 |
| 6,711,447 B1 * | 3/2004 | Saeed ............... | 700/82 |
| 6,804,632 B2 * | 10/2004 | Orenstien et al. ...... | 702/188 |
| 6,920,581 B2 * | 7/2005 | Bigbee et al. ........ | 714/10 |
| 7,100,060 B2 * | 8/2006 | Cai et al. .......... | 713/320 |
| 2003/0135771 A1 | 7/2003 | Cupps et al. ........ | 713/320 |

FOREIGN PATENT DOCUMENTS

JP    07-325788    12/1995

OTHER PUBLICATIONS

Chinese Office Action dated Sep. 8, 2006.
Chinese Office Action dated Nov. 9, 2007.

* cited by examiner

*Primary Examiner*—Mark Connolly
(74) *Attorney, Agent, or Firm*—KED & Associates, LLP

(57) ABSTRACT

Embodiments of an apparatus and methods for controlling power of a processor having a plurality of cores can independently control individual or selected cores and power supply circuits corresponding to the cores based on, for example, an operation state of the processor or a power mode. Embodiments of an apparatus for controlling power of a processor having a plurality of cores can include a plurality of power supply units each capable of independently supplying a supply power to a plurality of cores provided in one processor, a unit for checking at least one among a use state, a use amount and a power mode of each core and for turning on/off each checked core, and a unit that contacts with the unit for checking for controlling the power supply units in response to an on/off operation of each core.

30 Claims, 5 Drawing Sheets

APPARATUS FOR CONTROLLING POWER OF PROCESSOR HAVING A PLURALITY OF CORES AND CONTROL METHOD OF THE SAME

BACKGROUND OF THE INVENTION

1. Field of the Invention

The present invention relates to an apparatus for controlling the power of a processor and a control method of the same, and in particular to an apparatus for controlling the power of a processor having a plurality of cores and a control method of the same.

2. Background of the Related Art

Generally, a portable computer such as a notebook computer, etc. has been widely used. The portable computer uses a battery power having a limited capacity as a system power. As shown in FIG. 1, a DC supply power converted and outputted by a DC/DC converter 10 is supplied to a core 21 through a power input unit 20 provided in a processor 200. The core 21 operates using the DC supply power.

Recently, a process having a plurality of different cores has been developed and commercially used. As shown in FIG. 2, a processor 210 having a plurality of cores includes a first core 21 and a second core 22. The first and second cores 21 and 22 are operated using the DC supply power supplied from the power input unit 20.

Since the first and second cores 21 and 22 are designed to use a lot of the power, the first and second cores 21 and 22 use a first DC/DC converter 10 and a second DC/DC converter 11. Here, the first and second DC/DC converters 10 and 11 are alternately turned on/off, so that the power corresponding to 50% of the total power consumption is stably supplied to each element in the system.

However, when one of the first core 21 and the second core 22 in the processor 210 is not used, for example, when only the first core 21 is used, since the first and second DC/DC converters 10 and 11 are alternately turned on/off, an unnecessary leakage current occurs by the second core 22 that is not currently used. Accordingly, the battery power having a limited capacity is inefficiently used.

As described above, the related art portable computers and processor have various disadvantages. For example, since the power is applied irrespective of the using state (error state, use amount, etc.) of each core and the power management mode set in the processor, leakage current occurs, and the power is inefficiently used.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention to provide an apparatus for controlling the power of a processor having a plurality of cores and a method for controlling a supply power supplied to a processor having a plurality of cores based on a use amount or an operation state of each core.

Another object of the present invention to provide an apparatus for controlling the power of a processor having a plurality of cores and a control method of the same capable of controlling cores and supply power based on a power mode.

Another object of the present invention to provide an apparatus for controlling the power of a processor having a plurality of cores and a method for controlling a supply power supplied to a processor having a plurality of cores that independently supplies power to each of the plurality of cores.

In order to achieve at least the above objects in a whole or in part, there is provided an apparatus for controlling power of a processor having a plurality of cores that includes a plurality of power supply devices each for independently supplying power to one of a plurality of cores provided in one processor, a first device for checking at least one among a core use state, a core power mode or a core use amount of each core and for turning on/off said each core and a second device for controlling the plurality of power supply devices according to said on/off operation of said each core.

To further achieve at least the above objects in a whole or in part, there is provided a method for controlling power of a processor having a plurality of cores that includes checking a use state of each of a plurality of cores provided in one processor and independently disconnecting power supplied to at least one core that is not being currently used as a result of the checking.

To further achieve at least the above objects in a whole or in part, there is provided a method for controlling power of a processor having a plurality of cores that includes checking a power management mode of a processor having a plurality of cores and selectively turning on each core of said plurality of cores based on the checked management mode and the use amount of the processor.

To further achieve at least the above objects in a whole or in part, there is provided a portable computer that includes a first circuit configured to determine a use state of a plurality of cores of a single processor and a second circuit configured to independently provide power to at least two cores based on the corresponding use state of the core.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Embodiments of a power control apparatus and method of a processor having a plurality of cores according to the present invention will now be described. The processor can be in a portable computer or the like. First, a power management mode will be described.

In the case of a conventional processor, the maximum clock frequency is a prescribed frequency such as 1.7 GHz. Further, the clock frequency is variably controlled.

For example, the clock frequency could be classified into a plurality of steps or speeds ranging from 600 MHz to a maximum 1.7 GHz, so that the processor can be properly operated. The input voltage could be varied, corresponding to the operation frequency of the processor, to thereby control the speed and power consumption of the processor.

In the case of the battery mode, it is possible to reduce the clock frequency of the processor to 600 MHz. At this time, the input voltage is reduced, so that the use amount of the battery or battery life is extended.

The above-described function can be implemented in a process called SpeedStep. Namely, the operation mode of the process could be changed by changing the input power. The above operation mode could be classified into the following categories.
1. The maximum battery mode is operated at a minimum frequency and voltage. As the use of the power is increased, it is needed to control the clock frequency. It is called Degrade Mode.
2. The battery optimized mode is operated at a minimum frequency and voltage. According to embodiments of the present invention, it means that one core of the processor is operated. It is called Constant Mode.
3. The automatic mode is directed to changing the frequency and voltage based on the use of the processor. It is called Adaptive Mode.
4. The maximum performance mode is operated at a maximum frequency and maximum voltage. According to embodiments of the present invention, it means that a plurality of cores of a processor are operated. It is called None Mode.

Figure 1:
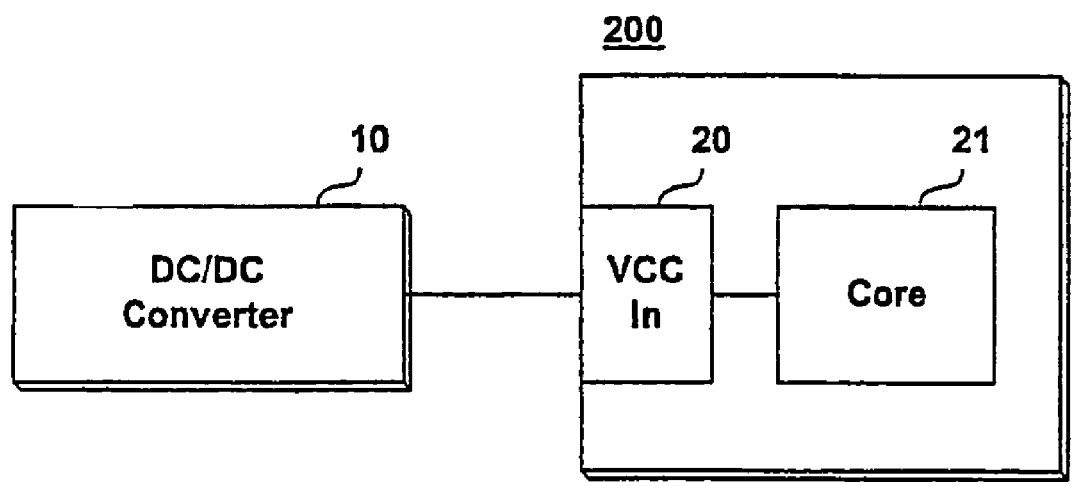
FIG. 1 is a diagram illustrating the construction of a conventional power control apparatus of a processor having one core.
Figure 2:
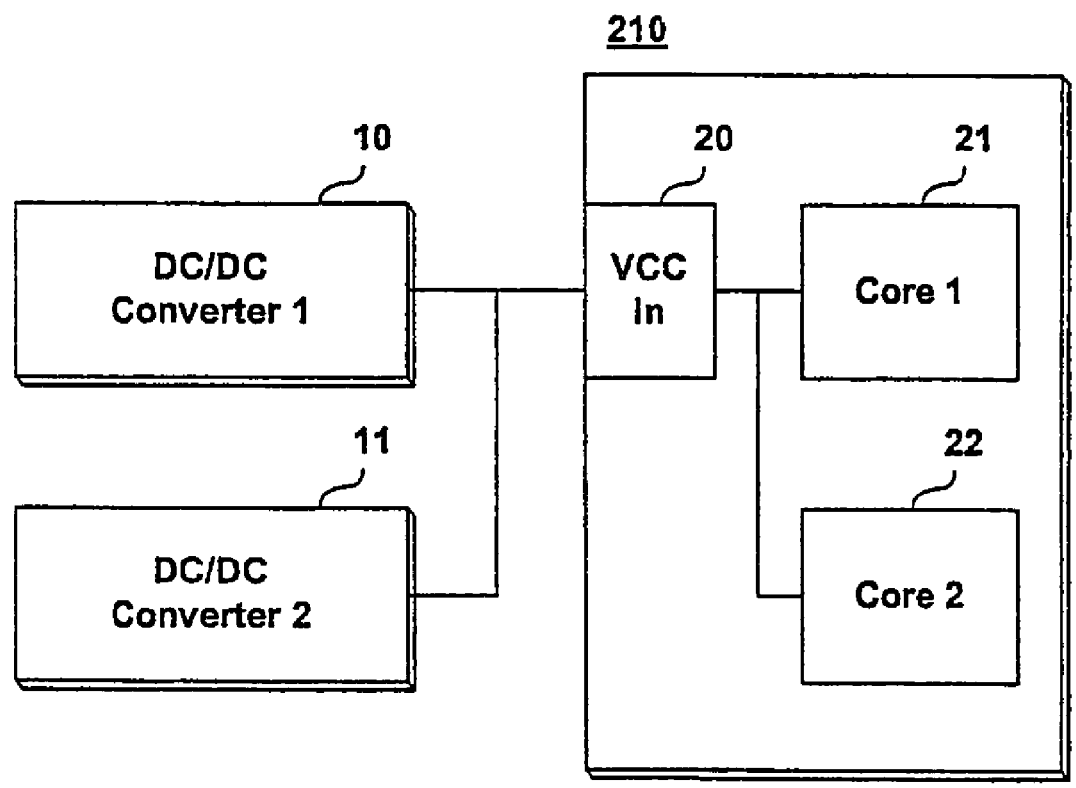
FIG. 2 is a diagram illustrating the construction of a related art power control apparatus of a processor having a plurality of cores.
Figure 3:
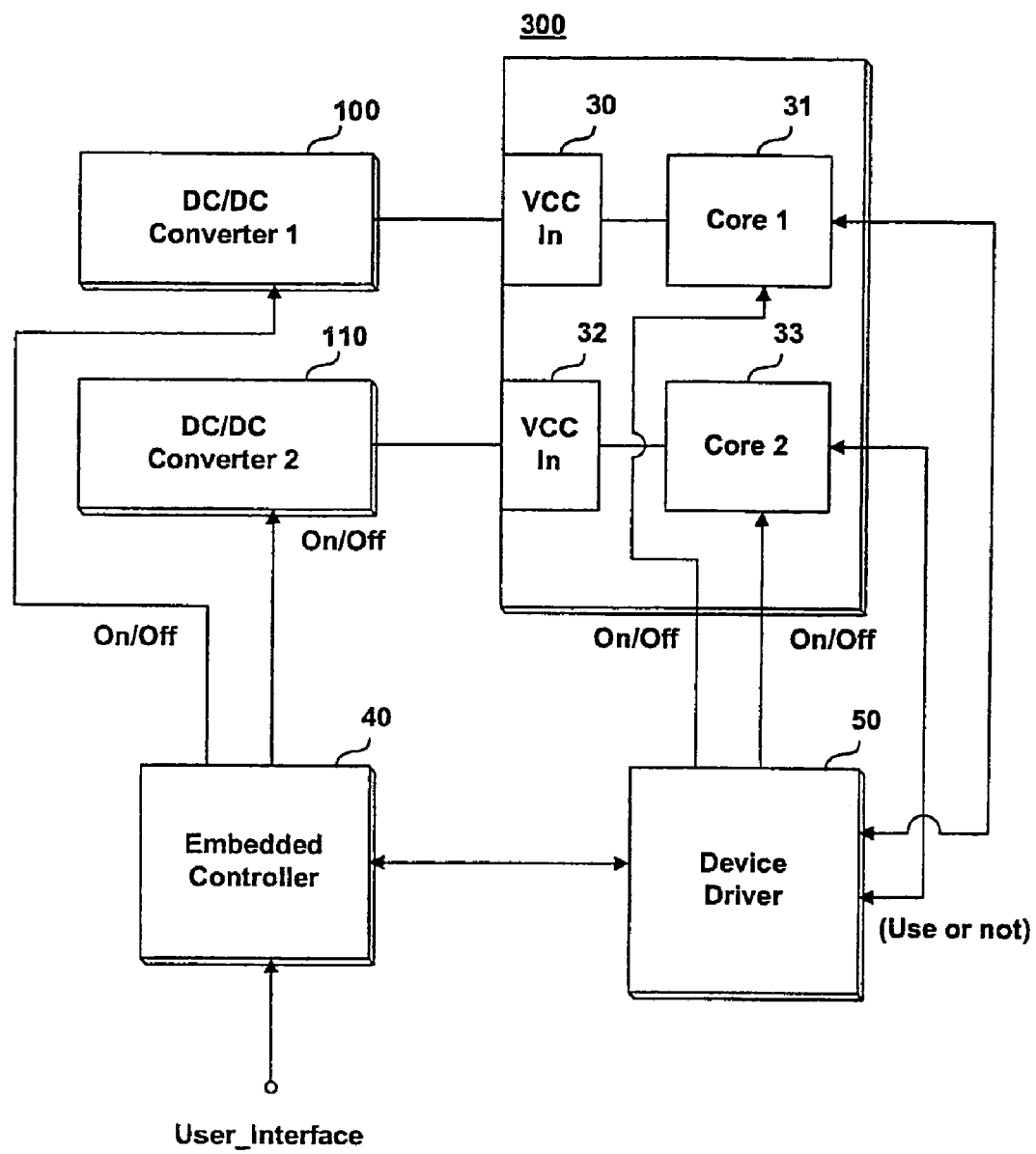
FIG. 3 is a diagram illustrating construction of a preferred embodiment of a power control apparatus of a processor having a plurality of cores according to the present invention.

FIG. 3 is a diagram illustrating construction of a power control apparatus of a processor having a plurality of cores according to an embodiment of the present invention. For example, a processor 300 can include a plurality of cores such as a first core 31 and a second core 33. The processor 300 can further include a first power input unit 30 for applying power to the first core 31, and a second power input unit 32 for applying power to the second core 33.

A first DC/DC converter 100 is preferably connected with the first power input unit 30 for applying a DC component to the first core 31. A second DC/DC converter 110 is preferably connected with the second power supply unit 32 for applying a DC power to the second core 33.

As shown in FIG. 3, the DC/DC converters 100 and 110, the power input parts 30 and 32 and the cores 31 and 33 can be correspondingly be coupled to each other. However, the present invention is not intended to be so limited. A device driver 50 in an operating system OS can check the state of use (e.g., normal operation states of used core or non-used core) of the first and second cores 31 and 33 provided in the processor 300. When a prescribed or certain error occurs in a certain core, the power management mode of the processor can be automatically changed to the constant mode for thereby independently turning off a corresponding core.

In addition, an embedded controller 40 can turn on/off the first and second DC/DC converters 100 and 110. For example, a DC/DC converter that supplies power to the core having an error can be independently turned off based on an embedded controller 40 interface with the device driver 50.

When an error does not occur in the first and second cores, the device driver 50 preferably checks the power management mode set in the processor 300. For example, in the case that the none mode is set, both the first and second cores 30, 31 can be turned on, and both the first and second DC/DC converters 100 and 110 can be turned on based on an interface with the embedded controlled 40.

When the power management mode of the processor 300 is set to the adaptive mode that is first implemented in an embodiment of the present invention, one core between the first and second cores (or additional ones), for example, only the first core 31 can be turned on, and only the first DC/DC converter 100 can be turned on based on an interface with the embedded controller 40.

The amount of use of the first core can be checked. For example, when the amount of the use of the first core reaches 100%, both the first and second cores 31 and 33 are turned on, and both the first and second DC/DC converters 100 and 110 are turned on based on an interface with the embedded controller 40.

According to one embodiment of the present invention, an ON/OFF control signal can be performed in a device driver of the OS (Operating System), a BIOS (Basic Input Output System) of the system or an EC (embedded controller). However, the present invention is not intended to be so limited.

The amount of the use of the first and second cores (e.g., the entire amount of the use of the processor) can be checked. For example, when the entire amount of the use of the processor is below 50%, only the first core 31 preferably is turned on, and only the first DC/DC converter 100 is turned on based on an interface with the embedded controller 40. The ON/OFF operations can be optimally performed or performed in combination based on the use state of each core and various power management modes, so that battery power consumption because of current leakage can be reduced or prevented. The performance of the processor can be maintained in a selected or an optimum state.

Figure 4:
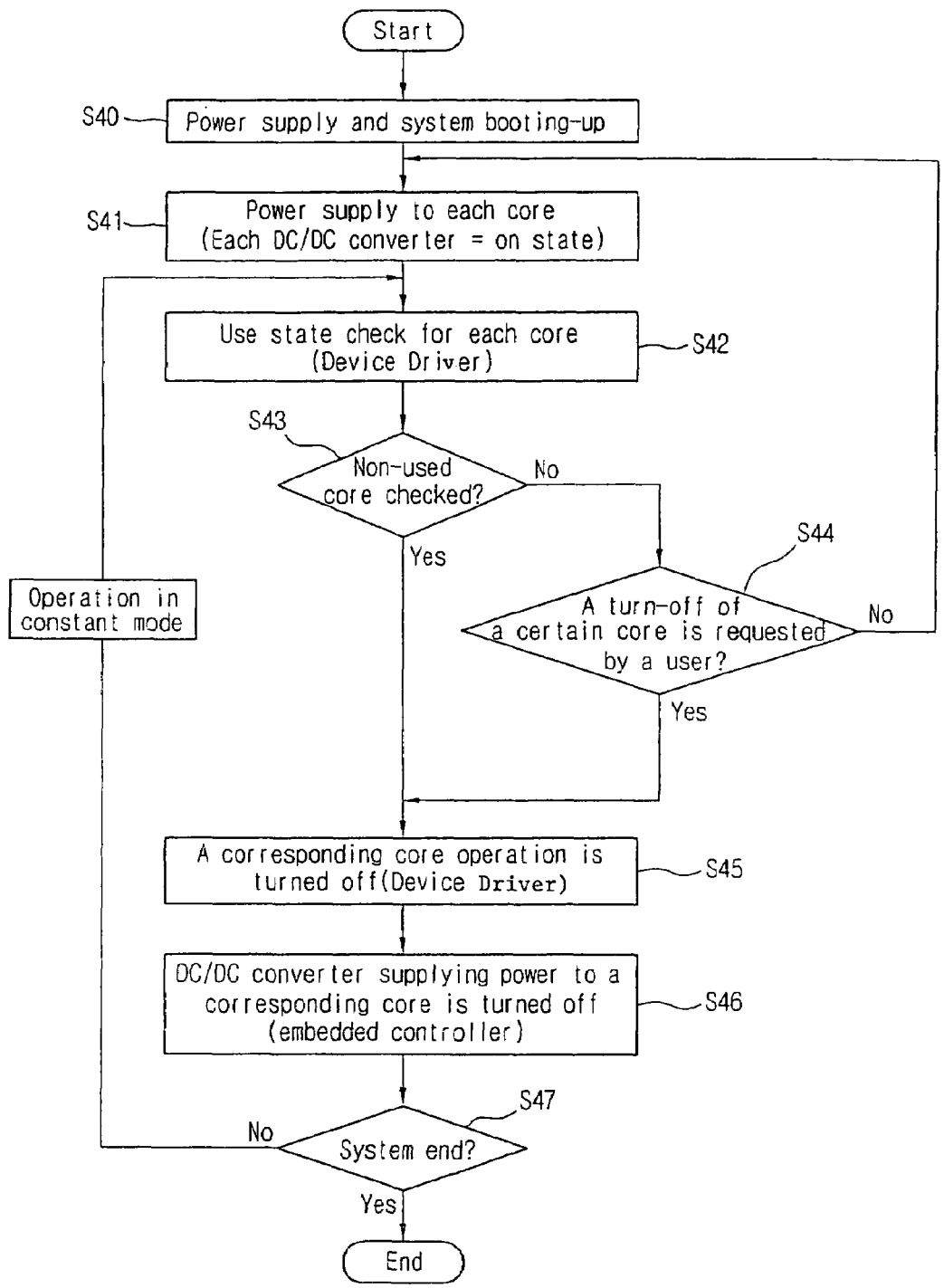
FIG. 4 is a flow chart of a preferred embodiment of a power control method based on the use of a core in a processor having a plurality of cores according to the present invention.

Operations according to embodiments of the present invention will now be described. FIG. 4 is a flow chart of an embodiment of a power control method based on the use of a core in a processor having a plurality of cores according to the present invention. The embodiment of a power control method can be applied to and will be described using the apparatus of FIG. 3. However, the present invention is not intended to be so limited.

For example, in the portable computer such as a notebook computer, etc., when a power supply and a system booting sequence are performed (block S40), the embedded controller 40 can allow the first and second DC/DC converters 100 and 110 to be turned on. Further, the device driver 50 can allow the first and second cores 31 and 33 provided in the processor 300 to be turned on (block S41).

In addition, the device driver 50 can check the use state (e.g., status) of the first and second cores 31 and 33 provided in the processor (block S42). As a result of the check, in the case that a non-use core is detected (block S43), for example, when the first core is being used, and the second core is not used, the device driver 50 can allow the first core 31 to maintain a turned on state and allows the second core 33 to be turned off (block S45).

The device driver 50 can provide the use state of the plurality of cores based on an interface with the embedded controller 40. For example, the device driver can inform the embedded controller 40 of a state that the first core is being used, and the second core is not used. The embedded controller 40 can allow the first DC/DC converter 100 to maintain a turned on state where the first DC/DC converter 100 supplies the DC power to the first core that is currently being used and can allow the second DC/DC converter 110 to be turned off where the second DC/DC converter 110 applies the DC power to the second core (block S46).

Thereafter, it can be checked whether the system is completed (e.g., enabled) or not (block S47). When the system is not intended to be turned off, it is preferably operated based on the constant mode by the core that is not turned off (block S48). From block S48, control can jump to block S42.

The disconnection of the power supply with respect to the core can be designated by a user (e.g., block S44). For example, the user can designate a certain process for disconnecting the power supply supplied to the second core 33, and the embedded controller 40 can allow the second DC/DC converter 100 to be turned off where the second DC/DC converter 110 applies the power to the second core 33 and can allow the second core 33 to be turned off based on an interface with the device driver 50.

As described above, the power control method of FIG. 4 can control each unnecessary (e.g., unused) core and DC/DC converter to be independently turned off based on the use state of each core provided in the processor or a user's selection. Thus, it is possible to efficiently reduce or prevent the leakage of current and over consumption of battery power.

Figure 5:
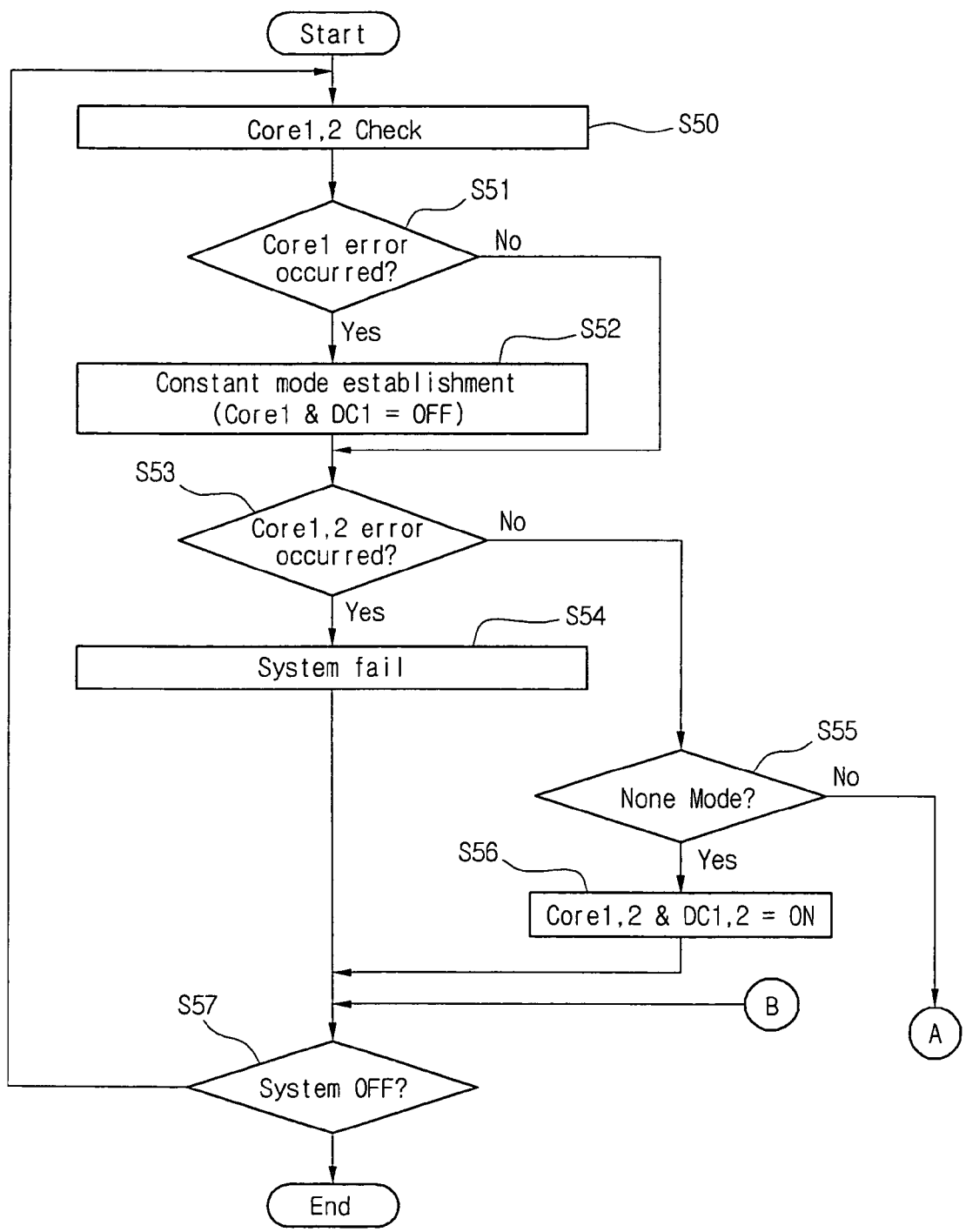
FIGS. 5 and 6 are flow charts of a preferred embodiment of a power control method based on the use of a plurality of cores and a power mode according to the present invention.
Figure 6:
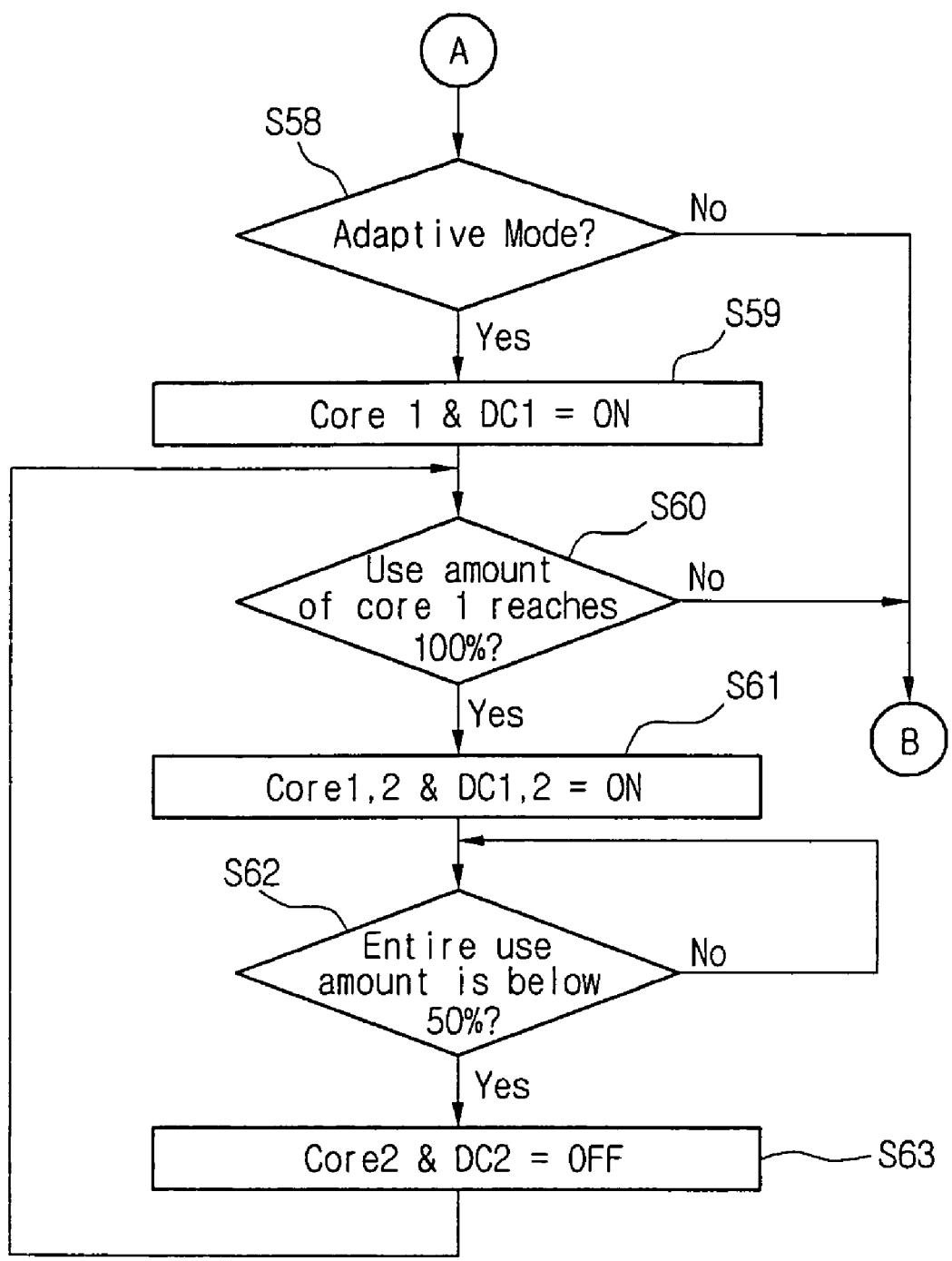

FIGS. 5 and 6 are flow charts illustrating another embodiment of a power control method based on the use of a plurality of cores and a power mode according to the present invention. The embodiment of a power control method can be applied to and will be described using the apparatus of FIG. 3. However, the present invention is not intended to be so limited.

As shown in FIGS. 5 and 6, the device driver 50 can check the user state of at least two cores (e.g., first and second cores 31 and 33) provided in the interior of the processor (block S50). As a result of the check, when a certain error occurs in one core, for example, an error occurs in the first core 31 (block S51), the device driver 50 can allow the power management mode of the processor 300 to be automatically set to a selected mode (e.g., the constant mode). Then, the first core 31 can be turned off and the corresponding first DC/DC converter 100 can be turned off (block S52).

As described above, the current leakage does not occur by the first core 31 which has an error, and the first DC/DC converter 100 adapted to apply the power responsive to the first core. Further, a normal operation can be achieved by additional cores, e.g., the second core 33, that does not have any error.

Then, a check can be performed for an error in each of the at least two cores (block S53). As a result of the check, for example in the case that the error occurs in both the cores (e.g., all processor cores), the error occurs in both the first and second cores 31 and 33 (block S53), it can be judged as the system fail (block S54).

As a result of the check, when the error does not occur in the cores, the device driver 50 can confirm a selected (block S53) power management mode (e.g., set in the processor 300). For example, the power management mode could be set to none mode, constant mode or adaptive mode or the like, for example, based on the user's selection.

The confirmed power management mode can be (e.g., set) the none mode (block S55), where the device driver can 50 allow the first and second cores 31 and 33 to be turned on and allow the first and second DC/DC converters 100 and 110 to be turned on based on an interface with the embedded controller 40. Therefore, both the first and second cores 31 and 33 (e.g., all cores) are operated to achieve a higher or the maximum performance in the processor (block S56). In this case, over power consumption can occur.

The confirmed power management mode can be (e.g., set) the adaptive mode (block S58), where the device driver can 50 allow a certain preset core/subset of cores, for example, the first core 31 to be turned on and allow the first DC/DC converter 100 to be turned on based on an interface with the embedded controller 40 (block S59).

Further, the use amount of the preset core can be checked (blocks S60, S62). For example, when the use amount of the first core reaches 100% (block S60), the additional core/cores (e.g., second core 33) that was turned off, can be turned on so that both the first and second cores (e.g., additional) are turned on. The second DC/DC converter 110 that was turned off, can be turned on based on an interface with the embedded controller 40, so that both the first and second DC/DC converters 100 and 110 are turned on.

When multiple cores (e.g. both the first and second cores 31 and 33) are turned on, the device driver 50 checks the use amounts of the cores (e.g., first and second cores), respectively, for thereby checking the entire use amount of the processor. For example, as a result of the check, when the entire use amount of the processor is below a prescribed amount (e.g., 50%) (block S62), the second core 33 can be turned off, and the second DC/DC converter 110 can be turned off based on an interface with the embedded controller 40 (block S63).

In the none mode or adaptive mode, when an error occurs in one of two cores, the device driver 50 can allow the power management mode to be automatically set to the constant mode for thereby turning off the core that has an error, and the DC/DC converter that applies the power to the core is turned off. The above operations can be repeatedly performed (block S57).

Therefore, when the power management mode of the processor is set in the adaptive mode, the device driver 50 can allow the first and second cores (e.g., a plurality of cores) to be selectively turned on/off based on the use amount of a core being used or the entire use amount of the processor. The embedded controller 40 can allow the first and second DC/DC converters to be selectively turned on/off to reduce or minimize the power consumption of the battery by the leakage current. Therefore, the performance of the processor can be improved or optimized.

Embodiments according to the present invention relate to a power control apparatus and methods of a processor having a plurality of cores. In the processor having a plurality of cores according to embodiments of the present invention, power applied to the cores can be controlled based on at least one member chosen from of the use amount and the operation state of the cores. The cores can also be controlled based on the power mode. However, the present invention is not intended to be so limited as other user selected or system criteria can be used to independently control operations of each of a plurality of cores.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of the present invention have various advantages. In embodiments according to the present invention, the usage states with respect to the cores provided in one processor can be checked, so that it is possible to uncouple the power supply to the cores that are not currently used. In addition, it is possible to independently disconnect the power supply applied to a prescribed core that a user designates. The states of uses of the cores provided in one processor can be checked, and the core having an error is directly disabled and power supply devices that apply a corresponding power to the disabled core can be disabled (e.g., off). Cores could be turned on/off based on the power management mode set in the processor. Cores can be selectively turned on/off based on the use amount of the processor while a DC/DC converter corresponding thereto is turned on/off In addition, the leakage current occurring because of at least one unnecessary core and power supply device can be reduced or prevented, and the processor is efficiently used. Thus, according to embodiments it is possible to efficiently use the power based on the use of the power matching with the operation state of the processor and the power mode.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for controlling power of a processor having a plurality of cores, comprising:
   a plurality of power supply units each for independently supplying power to a different one of the plurality of cores provided in one processor;
   a plurality of DC/DC converters each coupled to a different one of the plurality of power supply units to individually supply power to a corresponding one of the cores;
   a single device driver, coupled to each of the plurality of cores, to check at least one of a state of each core, a use amount of each core or a processor power mode of each core, wherein the single device driver provides separate and individual ON and OFF control to each of the cores of the one processor; and
   a controller, coupled to the single device driver, to separately and individually provide ON and OFF control to each of the DC/DC converters based on the checked state of each corresponding core, the checked use amount of each corresponding core or the checked processor power mode of each corresponding core by the single device driver.

2. The apparatus of claim 1, wherein the controller controls one of the DC/DC converters for supplying DC power to each corresponding core in response to the control of said each of the plurality of cores by the single device driver.

3. The apparatus of claim 1, wherein the processor power mode comprises at least one of: (1) a higher performance mode, (2) an adaptive mode having performance requirements that change responsive to a current processor amount of use, or (3) a power saving mode to reduce power consumption by the processor.

4. A method for controlling power of a processor having a plurality of cores, comprising:
   checking, by using a single device driver, a state of each of the plurality of cores provided in the one processor and a use amount of each of the plurality of cores, each of the plurality of cores to individually receive DC power from a corresponding one of a plurality of DC/DC converters;
   independently controlling, by using an embedded controller, power supplied to each of the plurality of cores by the plurality of DC/DC converters based on the checked use amount of the state of the plurality of cores, wherein the checked use amount indicates that the respective core is operating, and wherein each DC/DC converter of the plurality of DC/DC converters is controlled by the controller based on the checked state of each core, the checked use amount of each core or the checked processor power mode of each core by the device driver; and
   providing, by the single device driver, separate and individual ON and OFF control to each of the cores of the processor.

5. The method according to claim 4, further comprising discontinuing use of one of the plurality of cores when an error state occurs in said one of the plurality of cores.

6. The method of claim 5, further comprising determining system failure when an error state occurs in all of the plurality of cores.

7. The method of claim 4, further comprising independently setting a use state of at least one core according to a power management mode of the processor.

8. A method for controlling power of a processor having a plurality of cores, each of the plurality of cores to receive power from a corresponding one of a plurality of DC/DC converters, the method comprising:
   checking a power management mode of the processor having the plurality of cores and checking a use amount of each of the cores, wherein the power management mode and the use amount are checked by a single device driver; and
   selectively turning on each core of said plurality of cores based on the checked power management mode and based on the checked use amount of the plurality of cores, wherein an embedded controller performs on/off controls of the plurality of DC/DC converters that supply power to the corresponding cores, and wherein each DC/DC converter of the plurality of DC/DC converters is controlled by the embedded controller based on the checked state of each core, the checked use amount of each core or the checked processor power mode of each core by the single device driver; and
   providing, by the single device driver, separate and individual ON and OFF control to each of the cores of the processor.

9. The method of claim 8, wherein said checking the power management mode comprises checking whether the power management mode is at least one of: (1) a higher performance mode, (2) an adaptive mode having performance requirements that change responsive to a current processor amount of use, or (3) a power saving mode to reduce power consumption by the processor.

10. The method of claim 8, wherein said checking the power management mode of the processor comprises determining whether the power management mode set in the processor is a none mode or an adaptive mode.

11. The method of claim 10, wherein when the checked power management mode is the none mode, the device driver of an operating system (OS) turns on all of the cores, and the embedded controller turns on all of the plurality of DC/DC converters, wherein each DC/DC converter respectively provides power to one of said plurality of cores.

12. The method of claim 10, wherein when the power management mode is the adaptive mode, a single selected core among the plurality of the cores is turned on, comprising:
   determining a use amount of the selected core;
   enabling at least one additional core when the use amount is greater than a first prescribed value; and
   disabling said at least one additional core when a processor use amount is less than a second prescribed value.

13. The method of claim 10, wherein when the none mode or the adaptive mode is set, when an error occurs in a prescribed core, the power management mode is automatically set to a constant mode, and the prescribed core having the error is turned off, and a DC/DC converter that supplies power to the core having an error is turned off.

14. The method of claim 8, wherein when the use amount of one core reaches 100%, one additional core of the plurality cores is turned on, and the respective DC/DC converters corresponding to each of the cores are turned on.

15. The method of claim 8, wherein when an entire use amount of the processor including at least two cores is below 50%, only one of the two cores is turned on, and only the corresponding DC/DC converter is turned on by the controller based on an interface with the single device driver.

16. A method for controlling a processor having a plurality of cores, comprising:
   determining a first DC power management mode of a processor having a plurality of cores;
   selectively controlling DC power to each core of said plurality of cores based on the determined first DC power management mode and a use amount of the processor, wherein the use amount corresponds to an actual amount of use greater than zero, and each core is independently associated with one of a plurality of DC/DC converters, and the selectively controlling DC power to each core includes selectively controlling the respective DC/DC converters corresponding to each of the cores;
   determining a second DC power management mode of the processor; and
   selectively controlling DC power to each core of the plurality of cores based on the determined second DC power management mode and by selectively controlling the respective DC/DC converter corresponding to each core, and wherein each DC/DC converter of the plurality of DC/DC converters is controlled by an embedded controller based on the checked state of each core, the checked use amount of each core or the checked processor power mode of each core by a device driver,
   wherein said determining the first power management mode of the processor comprises determining whether the power management mode set in the processor is a none mode or an adaptive mode, and wherein when the determined first DC power management mode is the none mode, the device driver of an operating system (OS) separately and independently turns ON all of the cores of the processor, and the embedded controller turns ON all of a plurality of DC/DC converters, wherein each DC/DC converter respectively provides power to one of said plurality of cores, and wherein the device driver performs ON and OFF controls and the use amount checks of the cores, respectively, and wherein the embedded controller performs the ON and OFF controls of the DC/DC controllers that supply power to the cores, respectively.

17. The method of claim 16, wherein the power management modes include: (1) a higher performance mode, (2) an adaptive mode having performance requirements that change responsive to a current processor amount of use, and (3) a power saving mode to reduce power consumption by the processor.

18. The method of claim 16, wherein when the determined first DC power management mode is the adaptive mode, a single selected core among the plurality of the cores is turned on by the following:
   determining a use amount of the selected core;
   enabling at least one additional core when the use amount is greater than a first prescribed value; and
   disabling said at least one additional core when an entire use amount of a processor is less than a second prescribed value.

19. The method of claim 18, wherein when the use amount of the selected core reaches 100%, both the selected and one additional core are turned on, and the respective DC/DC converters corresponding to each of the cores are turned on.

20. The method of claim 18, wherein when the entire use amount of the processor is below 50%, only one of the two cores is turned on, and only the corresponding DC/DC converter is turned on by the controller based on an interface with the device driver.

21. The method of claim 16, wherein when the none mode or the adaptive mode is set and when an error occurs in a prescribed core, the power management mode of the processor is automatically set to a constant mode, the prescribed core having the error is turned off, and a DC/DC converter that supplies power to the core having an error is turned off.

22. A method for controlling power of a processor having a plurality of cores, each of the plurality of cores to receive power from a corresponding one of a plurality of DC/DC converters, the method comprising:
   supplying power to a single selected core from a corresponding one of the DC/DC converters coupled to the single selected core;
   determining a use amount of the single selected core, wherein the use amount is determined by a single device driver;
   turning on an additional core by the single device driver and a corresponding one of the DC/DC converters by a controller that supplies power to the additional core when the determined use amount of the single selected core by the single device driver is greater than a first prescribed value;
   determining an entire use amount of the processor by the single device driver when at least two of the cores are turned on; and
   turning off at least one core by the single device driver and a corresponding DC/DC converter by the controller that supplies power to said at least one core when the determined processor use amount is less than a second prescribed value, wherein the single device driver provides separate and individual ON and OFF control to each of the cores of the processor.

23. The method of claim 22, further comprising determining a system failure when an error state occurs in all of the plurality of cores.

24. The method of claim 22, further comprising independently setting a use state of at least one core according to a power management mode of the processor.

25. The method of claim 22, further comprising:
checking a power management mode of the processor; and
selectively turning on each core of said plurality of cores based on the checked power management mode, wherein selectively turning on each core of the plurality of cores is based on a processor use amount.

26. The method of claim 25, wherein said checking the power management mode comprises checking whether the power management mode is at least one of (1) a higher performance mode, (2) an adaptive mode having performance requirements that change responsive to a current processor amount of use, or (3) a power saving mode to reduce power consumption by the processor.

27. The method of claim 25, wherein said checking the power management mode of the processor comprises determining whether the power management mode set in the processor is a none mode or an adaptive mode.

28. The method of claim 27, wherein when the checked power management mode is the none mode, the single device driver of an operating system (OS) separately and individually turns on all of the cores, and the controller turns on all of the plurality of DC/DC converters, wherein each DC/DC converter respectively provides power to one of said plurality of cores.

29. The method of claim 22, further comprising turning on another core and the corresponding DC/DC converter or turning off an error-occurred core and the corresponding DC/DC converter when a certain error occurs when at least one core is turned on.

30. A computer comprising:
a plurality of DC/DC converters;
a processor having a plurality of cores, each of the plurality of cores to receive power from a corresponding one of the plurality of DC/DC converters, wherein a first one of the DC/DC converters to supply power to a single selected core; and
a single device driver to determine a use amount of the single selected core,
wherein the computer to turn on an additional core and the corresponding DC/DC converter that supplies power to the additional core when the determined use amount of the single selected core is greater than a first prescribed value, and
the single device driver to determine an entire use amount of the processor when at least two cores are separately and independently turned on by the single device driver, wherein the computer to turn off at least one core and the corresponding DC/DC converter that supplies power to said at least one core when the determined processor use amount is less than a second prescribed value, and
the computer to turn on an additional core and the corresponding DC/DC converter or to turn off an error-occurred core and the corresponding DC/DC converter, when a certain error occurs when at least one core is turned on, wherein the single device driver to separately and individually turn ON or turn OFF each of the plurality of cores of the processor, and the computer further comprises an embedded controller to separately and individually turn ON or turn OFF each of the plurality of DC/DC converters.

* * * * *